(12) United States Patent
Gero et al.

(10) Patent No.: US 11,038,854 B2
(45) Date of Patent: *Jun. 15, 2021

(54) TERMINATING SSL CONNECTIONS WITHOUT LOCALLY-ACCESSIBLE PRIVATE KEYS

(71) Applicant: Akamai Technologies, Inc., Cambridge, MA (US)

(72) Inventors: Charles E. Gero, Quincy, MA (US); Jeremy N. Shapiro, Brookline, MA (US); Dana J. Burd, Wakefield, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 254 days.

This patent is subject to a terminal disclaimer.

(21) Appl. No.: 15/588,907

(22) Filed: May 8, 2017

(65) Prior Publication Data

US 2017/0244681 A1 Aug. 24, 2017

Related U.S. Application Data

(63) Continuation of application No. 13/714,656, filed on Dec. 14, 2012, now Pat. No. 9,647,835.

(Continued)

(51) Int. Cl.
*H04L 9/32* (2006.01)
*H04L 29/06* (2006.01)
(Continued)

(52) U.S. Cl.
CPC ...... *H04L 63/0471* (2013.01); *G06F 16/2255* (2019.01); *H04L 9/083* (2013.01);
(Continued)

(58) Field of Classification Search
CPC . H04L 63/0442; H04L 63/045; H04L 9/0825; H04L 9/083; H04L 63/0823;
(Continued)

(56) References Cited

U.S. PATENT DOCUMENTS 7,043,632 B2 * 5/2006 Chapman ............ H04L 63/0428
713/151
8,347,079 B2 * 1/2013 Cho ...................... H04L 9/3226
380/44

(Continued)

OTHER PUBLICATIONS

Milgo, A Secure Unidirectional Proxy Re-Encryption Using Identity and Secret Key Exchange, Mar. 21, 2009, ACM, pp. 1-5.*

(Continued)

*Primary Examiner* — Roderick Tolentino
*Assistant Examiner* — Jenise E Jackson
(74) *Attorney, Agent, or Firm* — David H. Judson

(57) ABSTRACT

An Internet infrastructure delivery platform (e.g., operated by a service provider) provides an RSA proxy "service" as an enhancement to the SSL protocol that off-loads the decryption of the encrypted pre-master secret (ePMS) to an external server. Using this service, instead of decrypting the ePMS "locally," the SSL server proxies (forwards) the ePMS to an RSA proxy server component and receives, in response, the decrypted pre-master secret. In this manner, the decryption key does not need to be stored in association with the SSL server.

19 Claims, 3 Drawing Sheets

Related U.S. Application Data

(60) Provisional application No. 61/576,378, filed on Dec. 16, 2011.

(51) Int. Cl.
*G06F 16/22* (2019.01)
*H04L 9/08* (2006.01)

(52) U.S. Cl.
CPC .......... *H04L 9/0825* (2013.01); *H04L 9/0838* (2013.01); *H04L 9/3263* (2013.01); *H04L 63/0435* (2013.01); *H04L 63/0485* (2013.01); *H04L 63/0823* (2013.01); *H04L 63/166* (2013.01); *H04L 2209/76* (2013.01)

(58) Field of Classification Search
CPC ... H04L 9/0838; H04L 9/3263; H04L 63/166; G06F 21/445
USPC ......................................................... 713/171
See application file for complete search history.

(56) References Cited

U.S. PATENT DOCUMENTS

| | | | | |
|---|---|---|---|---|
| 8,649,275 B2* | 2/2014 | Pyatkovskiy | ......... | H04L 43/028 370/250 |
| 8,806,609 B2* | 8/2014 | Gladstone | ............... | H04L 9/085 713/171 |
| 2006/0064750 A1* | 3/2006 | Kersey | ................ | H04L 63/0428 726/14 |
| 2007/0074282 A1* | 3/2007 | Black | .................... | H04L 63/166 726/14 |
| 2007/0157027 A1* | 7/2007 | Palekar | ............... | H04L 63/0428 713/171 |
| 2008/0098215 A1* | 4/2008 | Belgaied | ................... | H04L 9/00 713/160 |
| 2010/0153838 A1 | 6/2010 | Arnold et al. | | |
| 2011/0264905 A1* | 10/2011 | Ovsiannikov | ..... | H04L 29/08792 713/151 |
| 2012/0182884 A1* | 7/2012 | Pyatkovskiy | ......... | H04L 43/028 370/250 |

OTHER PUBLICATIONS

Choudary et al, Modeling Key Compromise Impersonation Attacks on Group Key Exchange Protocols, Dec. 2011, vol. 14, No. 4, Article 28, ACM, pp. 28-28:4.*
Australia Application No. 201700724, Full Examination Report, dated Feb. 16, 2018.
Canada Application No. 2859285, Office action dated Sep. 21, 2018.
EPO Application128568976, Office action, dated Nov. 13, 2018.
Korea Application No. Oct. 2014-7019812, Office action, dated May 10, 2019.

* cited by examiner

TERMINATING SSL CONNECTIONS WITHOUT LOCALLY-ACCESSIBLE PRIVATE KEYS

BACKGROUND OF THE INVENTION

Technical Field

This application relates generally to secure network-based communications using cryptographic protocols such as SSL.

Brief Description of the Related Art

Distributed computer systems are well-known in the prior art. One such distributed computer system is a "content delivery network" or "CDN" that is operated and managed by a service provider. The service provider typically provides the content delivery service on behalf of third parties (customers) who use the service provider's infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

Secure Sockets Layer (SSL) is a well-known cryptographic protocol that is used to secure communications over networks such as the Internet. Cryptographic protocols such as SSL are often based on public key cryptographic systems, such as the RSA (Rivest, Shamir and Adelman) encryption algorithm. For a traditional RSA-based SSL session, the two sides of a connection agree upon a "pre-master secret" (PMS) which is used to generate the parameters for the remainder of the session. Typically, the two sides use RSA asymmetric encryption to establish the pre-master secret without exchanging the actual value in plaintext. In operation, the SSL client generates the pre-master secret and encrypts it with the SSL server's publicly available RSA key. This generates an encrypted pre-master secret (ePMS), which is then provided to the SSL server. The SSL server has a private decryption key, which is then used to decrypt the encrypted pre-master secret. At this point, both the client and the server have the original pre-master secret and can use it to generate the symmetric key used for actual encrypted and secure data exchange.

Decrypting the encrypted pre-master secret is the only time in the SSL connection that the private key is needed. This decryption occurs at a so-called SSL termination point. In many instances, the SSL termination point is insecure, and thus the storage and use of that key there presents significant security risks.

BRIEF SUMMARY

An Internet infrastructure delivery platform (e.g., operated by a service provider) provides an RSA proxy "service" as an enhancement to the SSL protocol that off-loads the decryption of the encrypted pre-master secret (ePMS) to an external server. Using this service, instead of decrypting the ePMS "locally," the SSL server proxies (forwards) the ePMS to an RSA proxy server component and receives, in response, the decrypted pre-master secret. In this manner, the decryption key does not need to be stored in association with the SSL server.

In one system embodiment, at least one machine in a first network-accessible location includes an RSA proxy server software program, and at least one machine in a second network-accessible location includes an RSA proxy client software program. The RSA proxy server software program and the RSA proxy client software program each include code to establish and maintain a secure (e.g., a mutually-authenticated SSL) connection there-between. The RSA proxy client software typically executes in association with an SSL server component (such as OpenSSL). According to this disclosure, however, SSL decryption keys are not accessible to the RSA proxy client software. Rather, decryption of encrypted pre-master secrets is off-loaded to the RSA proxy server software program. In operation, the RSA proxy client software program receives and forwards to the RSA proxy server software program over the mutually-authenticated SSL connection an encrypted pre-master secret associated with a new SSL handshake request received (at the RSA proxy client) from an end user client program (e.g., an SSL-enabled web browser, a native mobile app, or the like). The RSA proxy server software program decrypts the encrypted pre-master secret using a decryption key that is maintained at the RSA proxy server software program and not otherwise accessible to the RSA proxy client software program. The RSA proxy server software program then returns a decrypted pre-master secret to the RSA proxy client software program over the mutually-authenticated SSL connection. The end user client program and the SSL server component both are then in possession of the pre-master secret (and can use it to generate the symmetric key used for encrypting the connection between them).

Although not meant to be limiting, the first network-accessible location is a data center associated with an entity, and the second network-accessible location is a physical location remote from the first network-accessible location. As between the two locations, the data center (at which the RSA proxy server component executes) is more secure.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
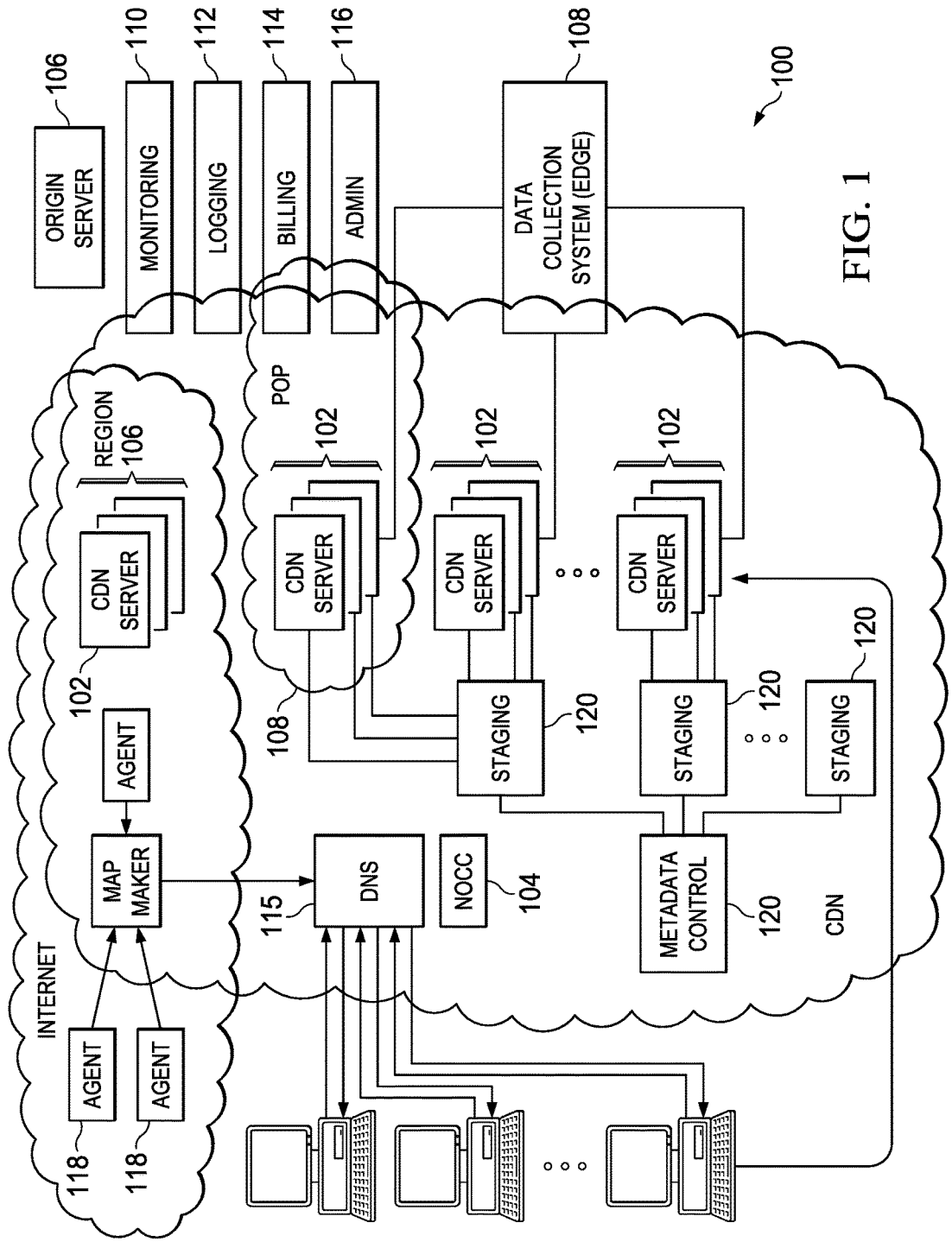
FIG. 1 is a block diagram illustrating a known distributed computer system configured as a content delivery network (CDN)

FIG. 1 illustrates a known distributed computer system that (as described below) is extended by the techniques herein to provide a single HTTP-based platform with the ability to deliver online HD video at broadcast audience scale to the most popular runtime environments and to the latest devices in both fixed line and mobile environments.

In a known system, such as shown in FIG. 1, a distributed computer system 100 is configured as a CDN and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
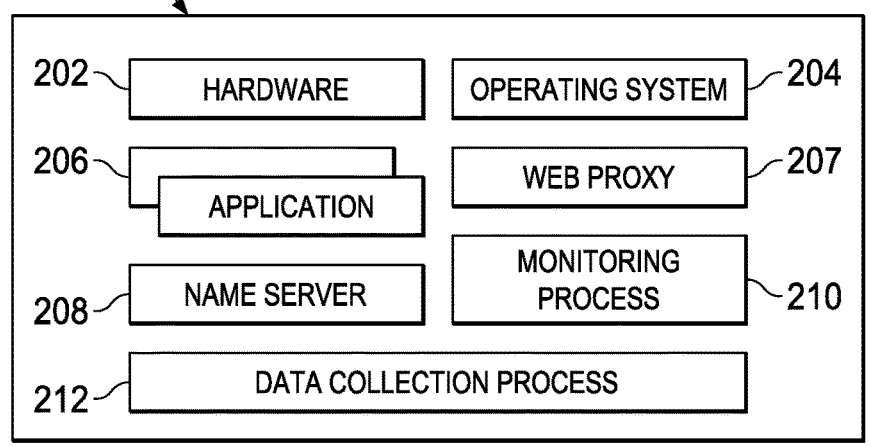
FIG. 2 is a representative CDN edge machine configuration.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" or "ghost" process), a name server 208, a local monitoring process 210, a distributed data collection process 212, and the like. For streaming media, the machine typically includes one or more media servers, such as a Windows Media Server (WMS) or Flash server, as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Figure 3:
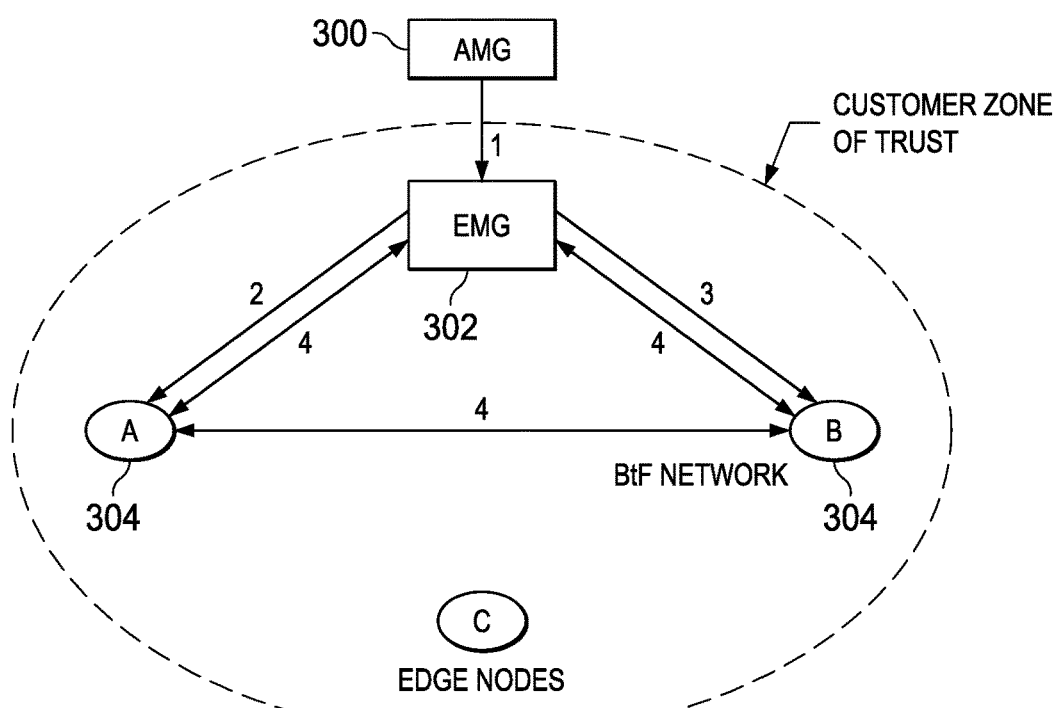
FIG. 3 illustrates a representation behind-the-firewall network configuration in which the subject disclosure may be practiced in one embodiment.

By way of further background, CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud. To accomplish these two use cases, CDN software may execute on virtual machines hosted in one or more customer data centers, and on virtual machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the service provider's other infrastructure (e.g., network and operations facilities). This type of managed solution provides an enterprise with the opportunity to take advantage of CDN technologies with respect to their Company's intranet. FIG. 3 illustrates a basic architecture of this type. In a representative implementation, a BTF network is managed by a management gateway (AMG) 300 and one or more enterprise management gateways (EMGs) 302. The AMG is located at a CDN operation and network service location. It manages a database of existing customers and has access to the EMGs. EMGs 302 exist inside the customer's firewall and manage the individual end nodes 304 of the BTF network. The end nodes correspond to the edge nodes in a traditional CDN. An AMG authorizes an EMG (step 1), and the EMG authorizes edge nodes A and B (steps 2 and 3). Both edge nodes now trust each other and the EMG to create a customer zone of trust as depicted (steps 4). According to this basic trust model, the AMG 300 grants authority to an EMG 302 to perform BTF functions for a company. The EMG 302 may then grant authority to each of the end nodes to perform various roles or tasks. Once trust is established via this chain of authorization, private data and secrets can be exchanged securely around the network. In this approach, the edge nodes typically are installed at remote branch offices (near the end users) and the EMG (parent nodes/regions) are installed at corporate hubs (typically, where application servers are located). As noted above, the solution extends acceleration for the enterprise to applications served anywhere on the Internet, such as SaaS (Software-As-A-Service) applications. By bridging an enterprise's CDN-based private overlay network with the existing CDN public internet overlay network, an end user at a remote branch office obtains an accelerated application end-to-end.

For BTF to properly accelerate SSL traffic, it needs the SSL keys and certificates on the end nodes. As described above, SSL uses a one-time RSA decryption to establish a private pre-master secret between the client and server. According to this disclosure, this RSA decryption is offloaded to a secure end node or other service which contains the private key, while the rest of the handshake and SSL connection continue as normal. This process is now described.

Terminating SSL Connections without Locally-Accessible Private Keys

With the above as background, the subject matter of this disclosure is now described. Familiarity with SSL handshaking is presumed.

Figure 4:
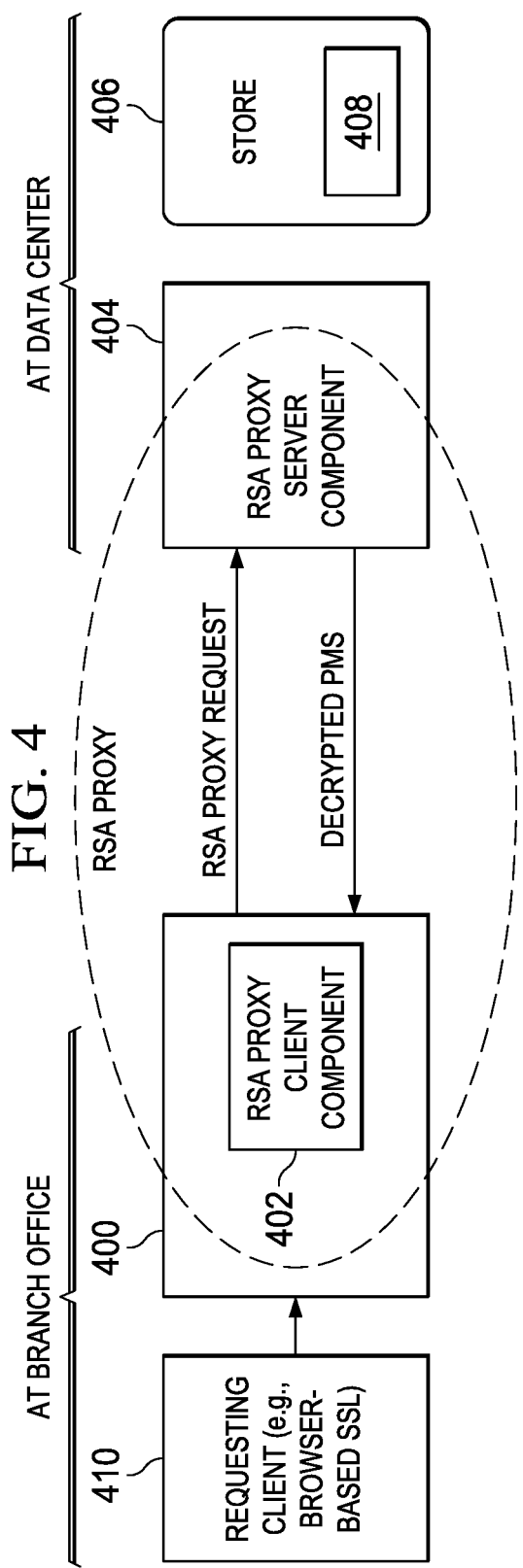
FIG. 4 illustrates the RSA proxy technique of this disclosure.

According to this disclosure, the conventional SSL handshake and, in particular, the decryption of the encrypted pre-master secret, occurs externally to (i.e., remotely from) the normal SSL termination point (the SSL server). As illustrated in FIG. 4, the SSL server 400 at the termination point includes a "client component" 402 of a proxy server whose "server component" 404 is located remotely. The server component 404 has associated therewith a data store 406 in which decryption key(s) 408 are maintained. These decryption keys 408 are not accessible to the client component 402. As will be described, during an SSL handshake, and instead of decrypting encrypted pre-master secrets itself, the client component 402 proxies (forwards) an encrypted pre-master secret that it receives (from a conventional SSL client 410) to the server component 404 and receives, in return, a decrypted pre-master secret. The remainder of the SSL transaction (between SSL server 400 and the SSL client 410) completes normally. In this approach, SSL private keys are not stored on the SSL server (or, more generally, at the SSL termination point).

Preferably, the client component 402 and the server component 404 of the proxy server are based on RSA encryption; thus, these components are sometimes referred to herein as components of an RSA proxy. The forwarding of the encrypted pre-master secret (from the client component to the server component) is sometimes referred to herein as an RSA proxy request. While RSA is a preferred algorithm, other asymmetric encryption algorithms may be used as well.

Referring now back to FIG. 3, branch office and data center machines preferably use a secure connection (e.g., mutually-authenticated SSL connections) to communicate and pass traffic. Other types of secure connection (e.g., IPSec VPN) may be used. These connections are used for RSA proxy requests, user data, and other traffic. As noted above, the RSA proxy client component executes in the branch office, while its associated server component executes in the (more secure) data center. In one embodiment, every machine has a single client certificate and keypair used for communication with peers. When a new machine is provisioned (e.g., by the CDN customer portal), the machine generates a private key and CSR (Certificate Signing Request) and sends the latter to the AMG. The CSR preferably contains a pair of identifiers, such as a unique serial number for the branch office or data center machine, as well as a serial number for the CSR version. The AMG signs the CSR (preferably using a certificate authority (CA) associated with the CDN) and sends the certificate to the branch office machine. Additionally, the AMG sends a message containing the certificate details (serial number pair) to any data center that may communicate with the branch office (based upon the peer configuration in the portal). The AMG, using other CDN key management infrastructure, signs the client and server CSRs (preferably using the CDN-associated CA). Preferably, both the branch office machine and data center machine maintain a collection of valid peers and CAs. This collection is updated by the AMG to support rotation and revocation. Moreover, preferably each box has a copy of the CA as well as a whitelist of the acceptable peers, identified by box and certificate serial number. To establish the mutual authentication, both sides of the mutual SSL connection (in other words, the RSA proxy client component on one side, and the RSA proxy server component, on the other) verify that the peer certificate chain has a root node that matches the CA and contains an allowable serial number pair. The client and server components also verify that the peer certificate contains the expected machine serial number.

As shown in FIG. 4, the RSA proxy client 402 is part of the SSL transport module. In operation, when a ClientHello is received (from an incoming SSL handshake request), the SSL module checks a learning table of IP addresses (plus port) and certs. If the entry does not exist, the data is streamed unmodified. If the data center machine can perform RSA proxying for the IP and port, it will send back a new message containing the RSA proxied server cert. The SSL module adds the IP address and cert to the learning table. On a next new (not resumed) SSL transaction for that IP address, the SSL module finds the entry and knows that it will be performing an RSA proxy transaction. Learning table entries are removed if they are used for an RSA proxy request which fails (or, in the alternative, after a period of not being used). These entries can be updated by the data center machine at any time, e.g., by the proxy client sending another message with the new cert for a particular IP and port.

During the handshake, the module terminates the SSL connection and sends a ServerCertificate to the requesting client with the cert from the learning table. When the ClientKeyExchange message and ePMS are received, the module sends the RSA proxy request to the correct data center. According to this disclosure, and as noted above, the RSA proxy request and response are handled by the server component of the RSA proxy server 404, which sends and receives the data over the mutually-authenticated SSL connection. If the server component 404 of the RSA proxy server returns a failure or times-out, the SSL module (the client component 402) terminates the client connection and the handshake does not succeed.

Without limitation, the SSL module is implemented as an SSL protocol terminator. In one embodiment, it is program code build on top of standard OpenSSL.

The RSA proxy client component (the SSL module in the branch office) uses a message interface to send the RSA proxy request and response over the mutually-authenticated SSL connection. Preferably, the RSA client request is a packet that includes the following information fields: {ePMS length, ePMS, hash of a server certificate}. The response packet returned from the RSA proxy server component (the SSL module in the data center) has the following information fields: {status, decrypted PMS length, decrypted pre-master secret}.

An embodiment of the RSA proxy server component executing at the data center facility is now described. As noted, its basic operation is to receive unencrypted packets containing the request specified above and to respond with the defined response packet. Preferably, the RSA proxy server maintains a least-recently-used (LRU) cache of ePMS values. Before performing a decryption, the module checks the cache to see if the requested ePMS has been seen. This check may be performed using a hash lookup scheme. If the hash of the encrypted pre-master secret already exists in the cache, a bad status is returned to the RSA proxy client component (and an error or alert is generated for the administrator). Preferably, the server component of the RSA proxy server rate limits requests to prevent a compromised machine from using a flush attack to remove a previously decrypted secret. Preferably, the server component of the RSA proxy server also maintains a table of the certificate and keypairs for which it can act as a proxy. Using this table (which also may be implemented as a hash table) enables the proxy server to efficiently look up server keypairs (e.g., by the hash of the certificate which is sent by the client component). Once the server component of the RSA proxy server has verified the ePMS is new, it adds it to the cache, looks up the server private key in its table, decrypts the ePMS, and sends the response.

The technique described herein has many advantages. The primary advantage is that SSL private keys are not stored on the SSL server. In a distributed solution such as described above, this means that the private keys are not stored in the branch office box that is terminating SSL, but instead at the data center box that is hosting the server component of the RSA proxy server. With replay protection implemented, an attacker cannot use a compromised SSL server to decrypt previous SSL transactions. On a normal SSL server, if the key is compromised, other technologies (such as certificate revocation lists or OCSP at the client browser) must be used to prevent use of the stolen SSL key. With RSA proxy, the service provider only needs to make a configuration change in the RSA proxy server. Using this distributed approach, the computationally-expensive part of the SSL transaction, the RSA decryption, can be done on a machine with custom hardware in the data center.

If a web proxy node (at a branch office) is discovered to be compromised, the administrator simply needs to remove authenticated credentials for the compromised node. For standard SSL, the revocation would need to be done on each end user system, which may be more difficult to administer. Additionally, key rotation only needs to occur on the RSA proxy machine, rather than all the web proxy machines, as would be required with standard SSL.

The behind-the-firewall embodiment is not intended to limit this disclosure. The RSA proxy approach may be used whenever an enterprise uses CDN technologies (such as described above) over Internet links as an optimize WAN connecting branches, data center, teleworks and mobile users to applications over the Internet. Still more generally, the approach may be used whenever one party (the client) wishes to encrypt communications via RSA-based SSL with another party (the server) and the server is not trusted to store the RSA private key directly.

In a representative implementation, the RSA proxy is implemented in software, as computer program instructions executed by a processor.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system or the like.

The functionality may be implemented with other application layer protocols besides HTTPS, such as SSL VPN, or any other protocol having similar operating characteristics.

There is no limitation on the type of computing entity that may implement the client-side or server-side of the connection. Any computing entity (system, machine, device, program, process, utility, or the like) may act as the client or the server.

While the techniques herein are described in the context of an RSA proxy for use in an SSL communication, this is not a limitation. Moreover, the scheme may be implemented in other transport protocols (such as TLS) that are protected by cryptographic techniques. More generally, the techniques herein may be used in any context in which secret data needs to be exchanged from one peer to another using asymmetric cryptography and wherein the receiving peer is not trusted to have the private key.

What is claimed is as follows:

1. Apparatus that is a first machine located behind a firewall of an enterprise, the enterprise being a customer of a service provider that provides an acceleration service via an overlay network, comprising:
    a processor;
    computer memory holding program code configured to be executed by the processor, the program code configured as a client component of a split proxy server, the split proxy server also having a server component distinct from the client component and that executes on a second machine located remote from the first machine, the second machine located in a data center associated with the overlay network and managed by the service provider, comprising:
        code operative in response to receipt of a handshake request from a client to determine whether a key exchange can be processed in part using a private key held in association with the server component of the split proxy server;
        code operative in response to determining, based on information in a data structure, that the key exchange can be processed in part using the private key held in association with the server component of the split proxy server, to forward first information from the client component of the split proxy server to the server component of the split proxy server, the first information configured to be processed using the private key maintained in association with the server component of the split proxy server; and
        code operative to receive a response from the server component of the split proxy server, the response including second information, the second information having been generated at the server component of the split proxy server by generating a hash of the first information, using the hash as an index into a cache, determining based on the hash whether first information is already present in the cache, when the first information is not already present in the cache, storing the first information in the cache and applying the private key maintained at the server component of the split proxy server to the first information;
        wherein, following a successful completion of a handshake initiated by the handshake request, an application associated with the first machine is enabled to receive the acceleration service via the overlay network.

2. The apparatus as described in claim 1 wherein the first information is an encrypted pre-master secret and the second information is a decrypted pre-master secret, and wherein the program code further includes code to use the decrypted pre-master secret to generate a master secret.

3. The apparatus as described in claim 2 further including code to return the master secret to the client.

4. The apparatus as described in claim 2 wherein the pre-master secret is established using asymmetric Rivest-Shamir-Adelman (RSA).

5. The apparatus as described in claim 1 wherein the handshake request is one of: a Secure Sockets Layer (SSL) handshake request, and a Transport Layer Security (TLS) handshake request.

6. A method to secure a communication, comprising:
    establishing a connection between a client component of a split proxy server executing on a first machine, and a server component of the split proxy server executing on a second machine, the first machine located behind a firewall of an enterprise, the enterprise being a customer of a service provider that provides an acceleration service via an overlay network, the second machine located in a data center associated with the overlay network and managed by the service provider, the second machine located remotely from the first machine;
    receiving, by the client component of the split proxy server executing on the first machine, a handshake request;
    upon receipt of the handshake request, determining, by the client component of the split proxy server, and based on information in a data structure, whether a key exchange associated with the handshake request can be processed in part using a private key that is held remotely and in association with the server component of the split proxy server;
    based on determining that the handshake request can be processed in part by using the private key that is held remotely, proxying first information over the connection from the client component of the split proxy server to the server component of the split proxy server;
    receiving from the server component of the split proxy server, over the connection, a response that includes second information, the second information having been generated at the server component of the split proxy server by generating a hash of the first information, using the hash as an index into a cache, determining based on the hash whether first information is already present in the cache, when the first information is not already present in the cache, storing the first information in the cache and applying the private key maintained at the server component of the split proxy server to the first information; and
    using the second information to further the key exchange;
    wherein, following a successful completion of a handshake initiated by the handshake request, an application associated with the first machine is enabled to receive the acceleration service via the overlay network.

7. The method as described in claim 6 wherein the handshake request is one of: a Secure Sockets Layer (SSL) handshake request, and a Transport Layer Security (TLS) handshake request.

8. The method as described in claim 6 wherein the first information is an encrypted pre-master secret, and the second information is the pre-master secret.

9. A system, comprising:
    at least one machine in a first network-accessible location and that includes proxy server component software program that executes on hardware, the first network-accessible location being part of an overlay network that is managed by a service provider that provides an acceleration service via the overlay network;
    at least one machine in a second network-accessible location and that includes a proxy client component software program that executes on hardware, the second network-accessible location being behind a firewall of an enterprise, the enterprise being a customer of the overlay network service provider;

the proxy server component software program and the proxy client component software program comprising a split proxy and each including code to establish and maintain a connection there-between;

the proxy client component software program configured to receive a handshake request from a client;

the proxy client component software program operative to determine, based on information in a data structure, whether a key exchange associated with the handshake request can be processed using a private key held remotely and in association with the proxy server component software program;

the proxy client component software program, upon determining that the secure handshake request can be processed using the private key held remotely, forwarding to the proxy server component software program over the connection first information;

the proxy server software program configured to receive the first information forwarded from the proxy client software program;

the proxy server component software program further configured to return a response to the proxy client software program over the connection, the response including second information, the second information having been generated at the proxy server component software program by receiving the first information, generating a hash of the first information, using the hash as an index into a cache, determining based on the hash whether first information is already present in the cache, when the first information is not already present in the cache, storing the first information in the cache and applying the private key to the first information to generate the second information;

the proxy client component software program receiving the second information and using it to facilitate the key exchange during further processing of the handshake request;

wherein, following a successful completion of a handshake initiated by the handshake request, an application associated with the machine in the second network-accessible location is enabled to receive the acceleration service via the overlay network;

wherein the first network-accessible location is a data center associated with the overlay network managed by the service provider, the second network-accessible location being a physical location remote from the first network-accessible location.

10. The system as described in claim 9 wherein, as between the data center and the physical location, the data center has a higher degree of security.

11. The system as described in claim 9 wherein the proxy server component software program is associated with the cache, the cache storing encrypted pre-master secrets from at least the proxy client component software program.

12. The system as described in claim 11 wherein the cache is a least recently used (LRU) cache of encrypted pre-master secrets.

13. The system as described in claim 12 wherein the proxy server component software receives an encrypted pre-master secret as the first information, generates a hash of the received encrypted pre-master secret, and uses the hash as an index into the cache to determine whether the encrypted pre-master secret is present in the cache.

14. The system as described in claim 9 wherein the handshake request is one of: a Secure Sockets Layer (SSL) handshake request, and a Transport Layer Security (TLS) handshake request.

15. The system as described in claim 9 wherein the first information is an encrypted pre-master secret, and the second information is the pre-master secret.

16. Apparatus that is a second machine, the second machine located remotely from a first machine, the first machine located behind a firewall of an enterprise, the enterprise being a customer of a service provider that provides an acceleration service via an overlay network, the second machine being located in a data center associated with the overlay network and managed by the service provider, comprising:

a processor;

computer memory holding program code configured to be executed by the processor, the program code comprising code configured as a server component of a split proxy server, the split proxy server also having a client component distinct from the server component and that executes on the first machine remote from the second machine, the program code comprising:

code to receive from the client component of the split proxy server first information associated with a handshake request, the handshake request having been received at the client component of the split proxy server from a client, the first information having being received following a determination at the client component of the split proxy server that a key exchange associated with the handshake request can be processed in part using a private key held remotely and in association with the server component of the split proxy;

code to generate a hash of the first information, to use the hash as an index into a cache, to determine based on the hash whether first information is already present in the cache, when the first information is not already present in the cache, to store the first information in the cache, and to apply the private key to the first information to generate second information; and code to return a response to the client component of the split proxy server, the response including the second information;

wherein, following a successful completion of a handshake initiated by the handshake request, an application associated with the first machine is enabled to receive the acceleration service via the overlay network.

17. The apparatus as described in claim 16 further including a data store, the data store being the cache for storing encrypted pre-master secrets from at least the client component of the split proxy server.

18. The apparatus as described in claim 16 wherein the handshake request is one of: a Secure Sockets Layer (SSL) handshake request, and a Transport Layer Security (TLS) handshake request.

19. The apparatus as described in claim 16 wherein the first information is an encrypted pre-master secret, and the second information is the pre-master secret.

* * * * *